S. L. CZECH.
SPACER FOR BALL BEARINGS.
APPLICATION FILED MAY 7, 1915.
1,176,133.
Patented Mar. 21, 1916.
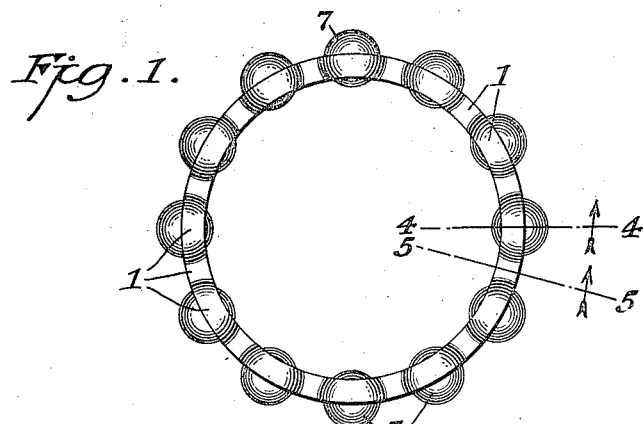
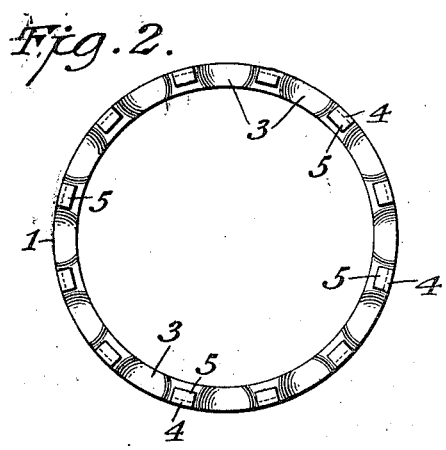
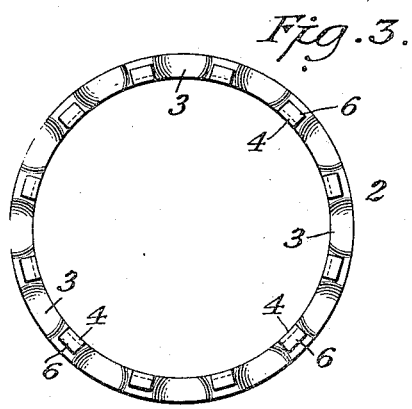
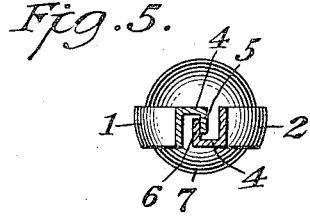
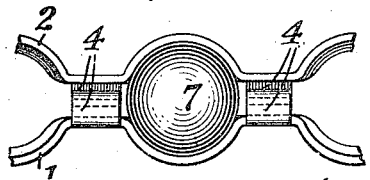
INVENTOR.
Stanislaus L Czech.
BY
Phillips Abbott, ATTORNEY.

UNITED STATES PATENT OFFICE.

STANISLAUS L. CZECH, OF FAIRVIEW, NEW YORK, ASSIGNOR OF ONE-THIRD TO HERMAN A. SCHATZ, ONE-THIRD TO JOHN W. SCHATZ, AND ONE-THIRD TO GROVER H. SCHATZ, ALL OF POUGHKEEPSIE, NEW YORK.

SPACER FOR BALL-BEARINGS.

1,176,133. Specification of Letters Patent. Patented Mar. 21, 1916.

Application filed May 7, 1915. Serial No. 26,472.

*To all whom it may concern:*

Be it known that I, STANISLAUS L. CZECH, a citizen of the United States, and a resident of Fairview, town of Poughkeepsie, county of Dutchess, and State of New York, have invented a new and useful Improvement in Spacers for Ball-Bearings, of which the following is a specification.

Devices for the separation of balls in ball bearings and their retention in proper relative position, technically called spacers, have heretofore been made in a great variety of forms.

My invention relates to that form of spacer in which each ball rests within a circular space made by suitably formed ring-like bands, which inclose the balls and hold them properly separated. Spacers of this form have been difficult and somewhat expensive to make because the formation of the series of spaces to receive the balls with the requisite exactness to prevent binding or friction of the balls within them has been a matter of some difficulty and expense. Furthermore such riveted spacers being necessarily quite rigid, lack flexibility and are apt, if the axis of rotation of the balls changes, as is inevitable while turning corners, on side hills, etc., to bind more or less upon the balls, interfering with their free, unimpeded rotation.

Under my invention I construct the spacer in two halves, each having a succession of half ball spaces made in it and provided with interlocking ledges or engaging parts so constructed that when the two separable, ring-like bands are properly assembled relative to each other and the balls placed within the spaces made for their reception, that then the balls will hold the two ring-like members of the spacer permanently in position and the spacer members will hold the balls permanently in position and the spacer members will not be rigidly connected together, on the contrary, capable of slight movement sufficient to give the requisite flexibility, and in addition to this all expense and distortion incident to riveting the two halves of the spacer together is avoided.

Referring to the drawings, Figure 1 is a side elevation showing the spacer and series of balls in position; Fig. 2 is a side elevation of one of the ring-like spacer bands; Fig. 3 is a side elevation of the other or companion ring-like spacer band; Fig. 4 is a transverse sectional view of the spacer bands taken on the line 4—4 of Fig. 1, looking in the direction of the arrow and showing a ball in elevation; Fig. 5 is a transverse sectional view of the spacer bands taken on the line 5—5 of Fig. 1 looking in the direction of the arrow and showing a ball in elevation; Fig. 6 is a plan view looking down upon the spacer, its bands being properly engaged and showing a ball in position.

In the drawings 1 represents one of the ring-like spacer bands, 2 the other or companion ring-like spacer band. Each of these bands is provided with a succession of half ball spaces 3, 3, and between these spaces are a succession of interlocking ledges or engaging parts 4, 4. Those on the spacer band 1 (see Fig. 2) extend from the outer periphery of the band approximately at right angles thereto and then inwardly at substantially right angles, as at 5 (see Fig. 5), and those on the spacer band 2 (see Fig. 3) extend from the inner periphery of the band 2 at substantially right angles and then outwardly at substantially right angles as at 6 (see Fig. 5).

7 represents the balls.

The parts are assembled as follows: The two ring-like spacer bands are brought together in such a manner that the projecting ledges on one band shall occupy the vacant spaces between the projecting ledges on the other band. Then the rings are given a slight rotary movement relative to each other in such manner that the inwardly and outwardly presented terminals 5 and 6 respectively of these ledges shall engage and interlock with each other and it will be seen that while the bands are held in this position the half ball spaces formed in one band accurately register with the half ball spaces formed in the other band, so that when the balls are inserted within these spaces and the whole aggregation of balls and bands is placed within the bearing, the balls will hold the bands in place and the bands will properly space and maintain the separation of the balls, the bands being entirely separable and free from permanent attachment with each other. It will also be noted that the expense and possible distortion consequent upon riveting the two bands together are avoided and that inasmuch as each band is free to make slight movement, they being confined in place solely by the balls, that flexibility, in other words, the ability to shift position to slight degree, exists, so that any binding or jamming action due to change of direction of the axis of rotation of the balls will be compensated for.

It will be obvious to those who are familiar with such matters that the details of construction above described and illustrated may be departed from and yet the essentials of the invention retained. I therefore do not limit myself to the details. My invention consists not in the details of construction but in the broader conception embodied in the two detachably attached ring-like spacer bands prevented from lateral displacement by engaging or interlocking surfaces made upon them respectively and which, when properly assembled, relative to each other, will afford a series of spaces for the reception and proper spacing of the balls, so that the balls themselves will prevent the two separable rings from circumferential displacement.

I claim:

1. A spacer for ball bearings comprising separate, independently movable, ring-like bands affording when assembled together a series of spaces for the reception of the balls and provided with interlocking parts between the ball spaces.

2. A spacer for ball bearings comprising separate, independently movable, ring-like bands affording when assembled a series of spaces for the reception of the balls and each having between the ball spaces projecting parts which interlock when assembled.

3. A spacer for ball bearings comprising separate, independently movable, ring-like bands each having a series of partial ball spaces and each provided with projecting interlocking parts between the ball spaces whereby the bands when assembled will hold the balls in position and be prevented from separation.

4. A spacer for ball bearings comprising two separate and independently movable, ring-like bands, each provided with a series of partial ball receiving spaces and each provided with projecting interlocking parts between the ball spaces, the bands when assembled affording a series of equally distanced spaces for the reception of the balls and being held in position by the engagement of the oppositely projecting interlocking parts and by the balls.

5. A spacer for ball bearings comprising two separate and independently movable ring-like bands each provided with partial ball receiving spaces and each provided between the ball spaces with projecting parts adapted to interlock whereby when the balls and the rings are assembled, each will hold the other in proper relative position.

In testimony whereof I have signed my name to this specification.

STANISLAUS L. CZECH.